United States Patent
Hashizume

(10) Patent No.: US 8,224,083 B2
(45) Date of Patent: Jul. 17, 2012

(54) EXTRACTION OF ILLUMINATION LIGHT IMAGE IN AN IMAGE PROCESSING APPARATUS, AND IMAGE PROCESSING METHOD AND STORAGE MEDIUM THEREFOR

(75) Inventor: Asako Hashizume, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 366 days.

(21) Appl. No.: 12/579,916

(22) Filed: Oct. 15, 2009

(65) Prior Publication Data

US 2010/0111407 A1 May 6, 2010

(30) Foreign Application Priority Data

Oct. 30, 2008 (JP) ................................. 2008-280060

(51) Int. Cl.
*G06K 9/00* (2006.01)
*G06K 9/34* (2006.01)

(52) U.S. Cl. ...................................................... 382/167

(58) Field of Classification Search .................. 382/162, 382/164, 165, 167, 254, 274; 358/1.9, 2.1, 358/461, 515, 518, 520, 522, 523, 525, 530; 348/223.1, 370, 655, 687, 750; 345/589, 345/590, 690, 698
See application file for complete search history.

(56) References Cited

U.S. PATENT DOCUMENTS

| | | | | |
|---|---|---|---|---|
| 5,517,333 | A * | 5/1996 | Tamura et al. | 358/518 |
| 6,664,973 | B1 * | 12/2003 | Iwamoto et al. | 345/589 |
| 7,612,824 | B2 * | 11/2009 | Hayaishi | 348/370 |
| 2001/0035988 | A1 * | 11/2001 | Semba et al. | 358/518 |
| 2003/0002059 | A1 * | 1/2003 | Zaklika et al. | 358/1.9 |
| 2003/0151694 | A1 * | 8/2003 | Lee et al. | 348/687 |
| 2009/0052774 | A1 * | 2/2009 | Yoshii et al. | 382/167 |
| 2010/0111407 | A1 * | 5/2010 | Hashizume | 382/164 |

FOREIGN PATENT DOCUMENTS

JP 5-127265 5/1993
JP 2001-223850 8/2001

* cited by examiner

*Primary Examiner* — Amir Alavi
(74) *Attorney, Agent, or Firm* — Fitzpatrick, Cella, Harper & Scinto

(57) ABSTRACT

For a read image having reflection of a light source, which occurs when a document is read, the reflection of the light source of the read image is corrected by the steps of: selecting an RGB color component having minimum average values of each RGB color component of a read image among RGB color components of an read image having reflection of a light source that occurs when a document is read; calculating the amount of change of luminance values of pixels of the read image derived from the reflection, from the values of pixels of the color components selected in the read image; and correcting the reflection of the light source in the read image by correcting the luminance values of pixels of the read image using the calculated amount of the change of the luminance values of the pixels.

10 Claims, 11 Drawing Sheets

REFLECTED IMAGE
(INPUT IMAGE)

ILLUMINATION LIGHT
IMAGE

REFLECTION REMOVED IMAGE
(OUTPUT IMAGE)

EXTRACTION OF ILLUMINATION LIGHT IMAGE IN AN IMAGE PROCESSING APPARATUS, AND IMAGE PROCESSING METHOD AND STORAGE MEDIUM THEREFOR

BACKGROUND OF THE INVENTION

1. Field of the Invention

The present invention relates to an image processing apparatus, an image processing method, and storage medium for processing an image obtained by reading a manuscript while irradiating it with light, and to a storage medium.

2. Description of the Related Art

Conventionally, a copier, a flat-head scanner and a facsimile etc. have been widely used as means for reading image information of a manuscript (document) electronically. Alternatively, there is also an image reading apparatus for reading an open page of a thick pamphlet or a book etc. from above. Manuscripts read by these image reading apparatuses include one-sheet-of paper shaped manuscripts such as a copier paper and a post card, and thick book shaped manuscripts such as a book and a magazine. The manuscripts having the latter shape (hereinafter referred to as book manuscripts) have a significant feature in that an opened page to be a read surface is not flat.

Here, for example, the image processing apparatus for processing the image obtained by reading a manuscript while irradiating it with light is constructed as in FIG. 1. In FIG. 1, reference numeral 101 denotes a platen; 102 and 118, light sources; 103, a reflection mirror; 104, a reading sensor; 105, a platen cover; 106, a controller; 107, a bus; 108, a setting UI; and 111, a lens. Reference numeral 110 denotes a reading device including necessary components for reading a manuscript. An internal state of the reading device 110 when reading a manuscript set with its manuscript surface downward on the platen 101 will be described with reference to FIG. 3A. Firstly, the light sources 102 and 118 emit light. The light sources 102 and 118 have spectral intensity in a wavelength region approximately within that of visible light. The manuscript is irradiated with the light from the light sources 102 and 118, and the light reflected on the manuscript is reflected by a plurality of reflection mirrors 103 and collected by the lens 111 to enter the reading sensor 104. In addition, the reading sensor 104 includes at least a photoelectric conversion element, accumulates electric charges having an amount according to the intensity of the incident light, and converts the electric charges into digital data using an A/D converter not shown in the figure, thereby converting the image information on the manuscript into digital image data. The digital data is processed in the controller 106. Intensity of the light incident on the reading sensor 104 depends on the distribution of spectral reflectance contained in the information of the manuscript.

The above-mentioned configuration of the image processing apparatus is a minimum combination required for constructing such a type of scanner that reads a manuscript surface while irradiating it with light from below the platen. However, for a type of scanner that reads a manuscript surface from above by placing a manuscript on the platen with its manuscript surface upward, the positional relation of parts is not always the same as that in FIG. 1. Exemplary configuration may include one having a different number of mirrors or one having a different reading sensor. Moreover, the reading sensor may be CCD or CMOS. COD is abbreviation of "Charge Coupled Device", and CMOS is abbreviation of "Complementary Metal Oxide Semiconductor".

When a book manuscript is read, as one of typical phenomena occurring due to an un-flat manuscript surface, there is a problem of reflection that is a phenomenon where light from a light source is reflected on the manuscript surface.

When light from the light source enters a manuscript surface that is floating over the platen, as illustrated in FIG. 3B, in some cases light of specular reflection or near specular reflection may pass through a slit and enter the sensor. Only for the portion in the manuscript surface where is irradiated with light at a specific angle, reflection light having higher intensity than those of surroundings is read by the sensor 104. This results in as if white light from the light source is reflected on the read image. This is a problem that necessarily occurs when a book manuscript is read by a reading device having no countermeasure against the reflection. The reflection becomes white stripes as in FIG. 2A if the light sources 102 and 118 have a rod-like shape like a xenon tube, and becomes in a state where white spots are arranged as in FIG. 2B if the light sources 102 and 118 have a point-like shape like LED. Although both of the above-mentioned cases are reflection phenomena originating from the same principle, the state of reflection changes depending on the state of the shape of the sources 102 and 118. If the light sources are point light sources, a problem in which unevenness of reflection occurs depending on a position is also present.

If a signal having too high intensity is input in the reading sensor 104, a blooming phenomenon where the sensor 104 is saturated will occur, resulting in pure white image signals. Moreover, even if the blooming phenomenon will not occur, at a portion where the sensor received a signal having higher intensity than those of surroundings as mentioned above, the image will be bright and whitish. These are (unwanted) reflection phenomena. In particular, for a paper having smooth and glossy surface such as a photographic printing paper or a glossy paper, the reflection tends to occur.

In Japanese Patent Laid-Open No. 2001-223850, a method for solving the blooming phenomenon is proposed. When light from the light source is within a certain angle range, the blooming phenomenon is avoided by controlling the transmittance of the light by diffusing or shielding the light. Further, it is also possible to specify a position on which a white spot occurs in advance by pre-scanning.

In Japanese Patent Laid-Open No. H05-127265(1993), a method for solving the unevenness of reflection when arranged point light sources are used as the light source is suggested. If point light sources are used, difference in the quantity of light between a light emission portion and a non-emission portion generates point-shaped reflection on the read image of a book manuscript. Thus, by covering coating film on the surroundings of the light emission portion so as to diffuse light, the quantity of light can be made uniform at both of the light-emission portion and the non-emission portion.

In case of solving the above-mentioned problem by diffusing the quantity of light as in Japanese Patent Laid-Open No. 2001-223850, some influences on the image quality are concerned, such as a noise due to the reduction of the quantity of light. Specifically, in case of point light sources, there is a problem in that areas having no reflection between the point light sources will be dark in a portion where the quantity of light is reduced, and thereby image quality of the areas will be different from those of other parts. Although, the approach of the Patent Japanese Patent Laid-Open No. 2001-223850 is effective for avoiding the blooming phenomenon, it is not described further how effectively the effect of reflection can be reduced. Above all, it is necessary for solving the problem to improve the device (hardware) in the image processing apparatus, and thereby cost and time are required.

Since Japanese Patent Laid-Open No. H05-127265(1993) reduces only the unevenness of the quantity of light, it can not be said that the problem of reflection is solved fundamentally.

Conventionally, as mentioned above, although in order to solve the problem of reflection occurring when a book manuscript is read, a technology for diffusing the light of the light source and a technology for controlling the angle of the light source have been present, a technology for solving the problem more effectively has been desired. Moreover, there have also been a problem of degradation of the image quality due to reduction of the quantity of light and a problem in that it is not possible to avoid the cost increase for improving the device itself. Thereby, correction using image processing by software is expected, but no effective method has been proposed until now.

An object of the present invention is to provide an image processing apparatus, an image processing method, and storage medium for reducing reflection effectively at low cost.

SUMMARY OF THE INVENTION

An image processing apparatus according to the present invention includes: a selection unit selecting an RGB color component having minimum average values of each RGB color component among RGB color components of a read image having reflection of a light source that occurs when a document is read; a calculation unit calculating the amount of change of luminance values of pixels of the read image derived from the reflection, from the values of pixels of the color components selected in the read image; and a correction unit correcting the reflection of the light source in the read image by correcting the luminance values of pixels of the read image using the calculated amount of change of the luminance values of the pixels.

According to the present invention, an image processing apparatus, an image processing method, and storage medium for reducing reflection effectively at low cost can be provided.

Further features of the present invention will become apparent from the following description of exemplary embodiments (with reference to the attached drawings).

DESCRIPTION OF THE EMBODIMENTS

Hereinafter, with reference to drawings, preferred embodiments of the present invention will be described. However, the scope of the invention is not limited to these embodiments.

[First Embodiment]

The present embodiment is characterized in that reflection of light source occurring when a book manuscript is read is reduced using image processing by software (execution of a program) without changing a device. However, it is required that a certain level of information of the image of a reflection part is remained in the read image.

Figure 1:
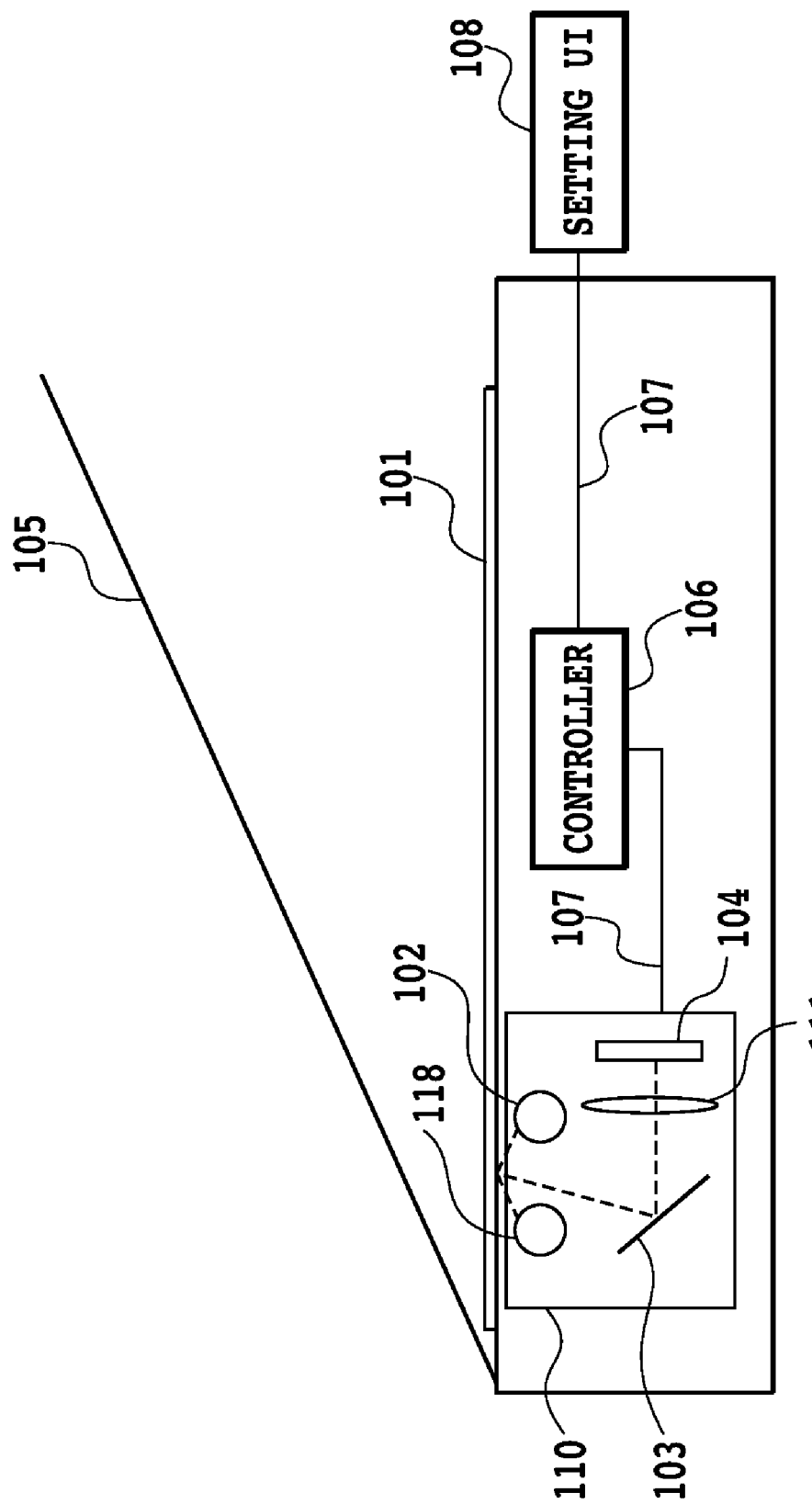
FIG. 1 is a conceptual view illustrating one exemplary configuration of an image processing apparatus according to the present embodiment.
Figure 2A:
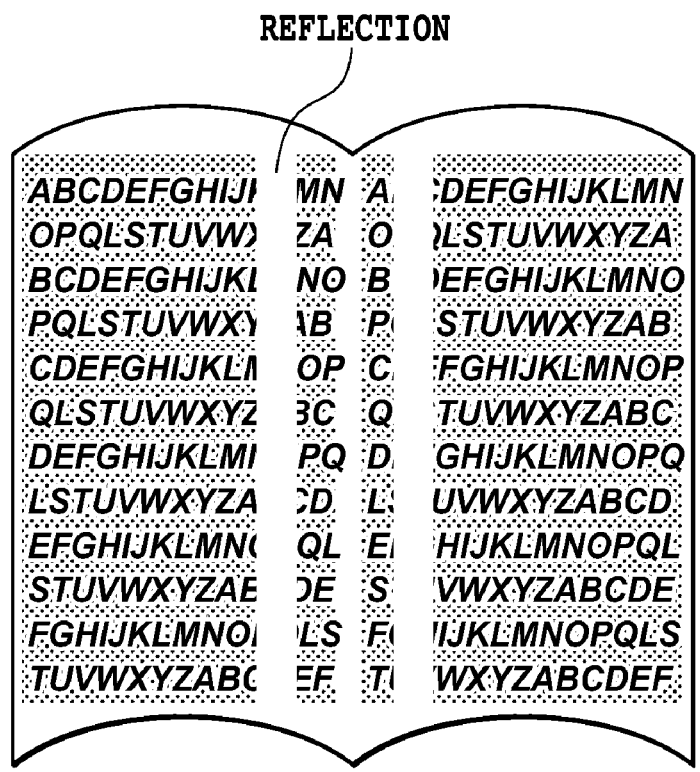
FIG. 2A is a schematic view of one example of a read image having reflection.
Figure 2B:
FIG. 2B is a schematic view of one example of a read image having reflection.
Figure 3A:
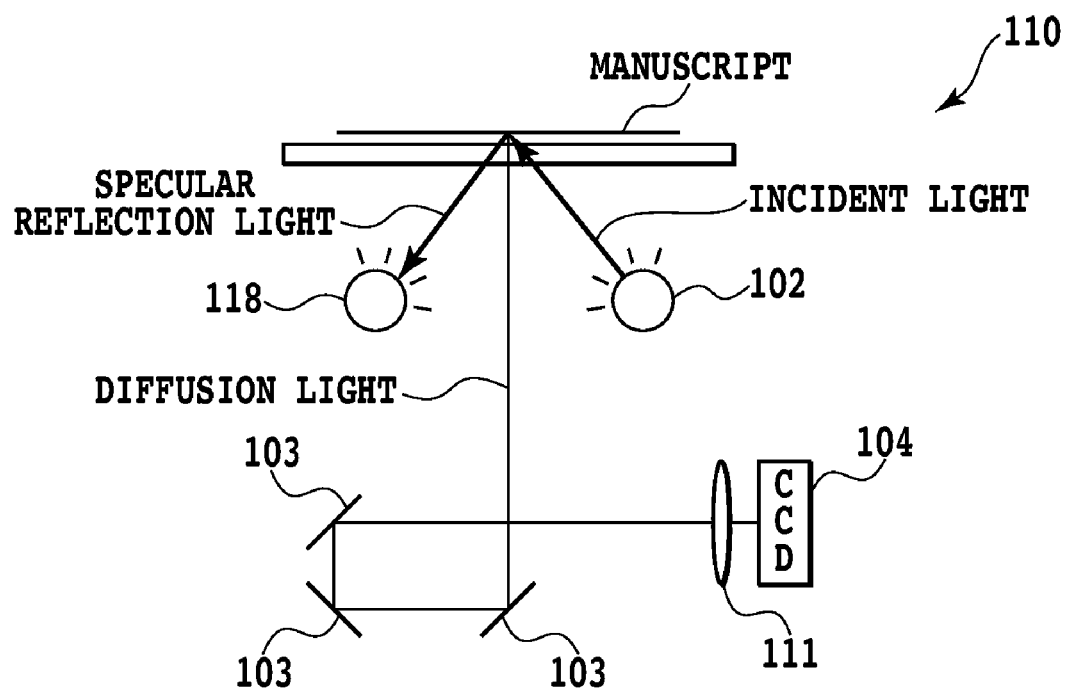
FIG. 3A is a conceptual view illustrating one example of the mechanism of reflection.
Figure 3B:
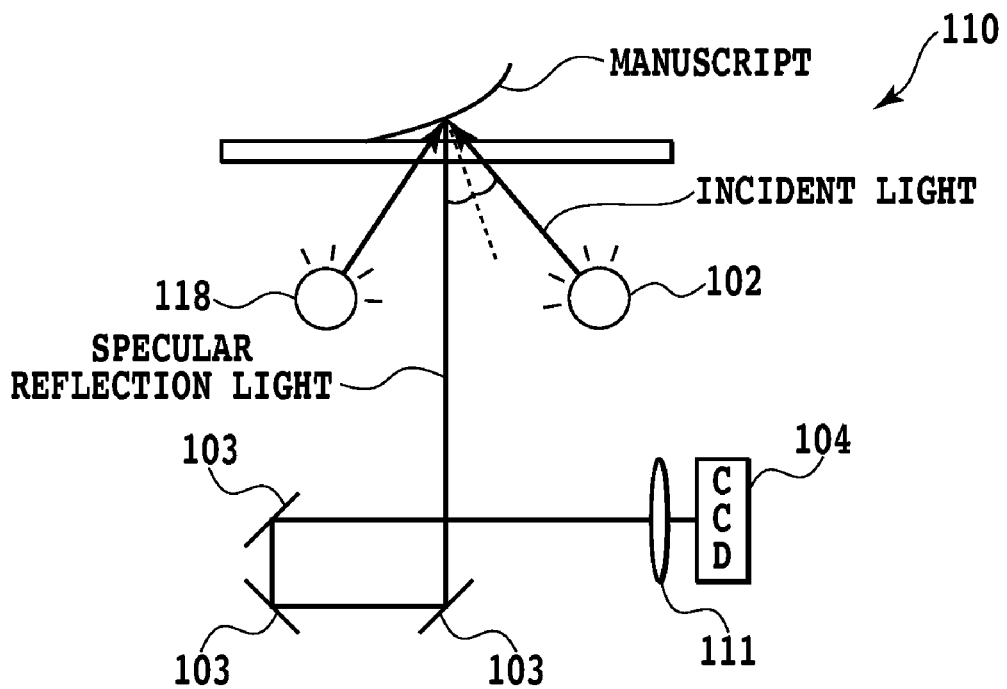
FIG. 3B is a conceptual view illustrating one example of the mechanism of reflection.

FIG. 1 is a view illustrating one example of the mechanical configuration of an image processing apparatus according to the present invention. Light sources 102 and 118, mirrors 103, a lens 111 and a reading sensor 104 are stored in a reading device 110. After bringing the manuscript surface into contact with a platen 101 and giving instruction to start reading from a setting UI 108, the light sources 102 and 118 emit light. The light sources 102 and 118 have spectral intensity in a wavelength region approximately within that of visible light. The manuscript is irradiated with light from the light sources 102 and 118, and the light reflected on the manuscript is reflected by some reflection mirrors 103, collected by the lens 111, and then enters the reading sensor 104. The reading sensor 104 includes at least a photoelectric conversion element, accumulates electric charges according to the intensity of the incident light, and converts the image information on the manuscript into digital image data by converting the electric charges into digital data using an A/D converter (not shown in the figure). The digital image data is processed in the controller 106.

Figure 4:
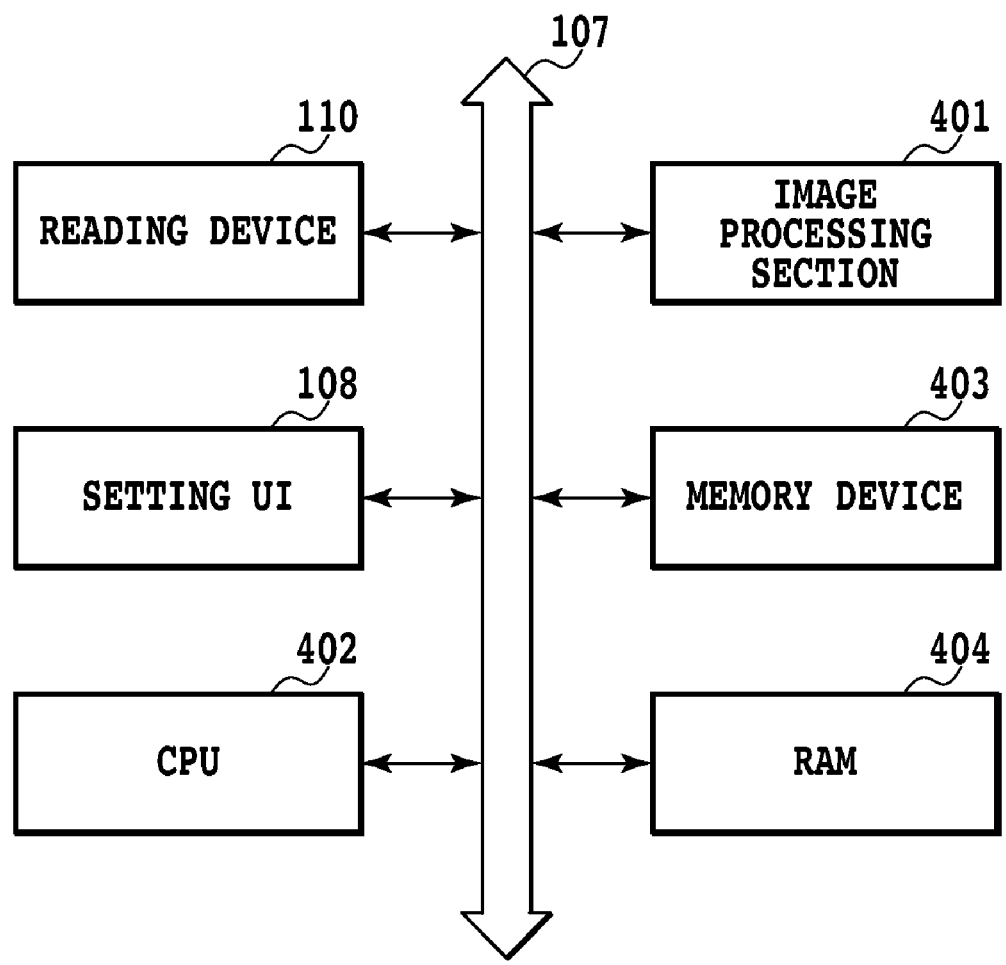
FIG. 4 is a block diagram illustrating one exemplary configuration of an image processing apparatus according to the present embodiment.

FIG. 4 is a block diagram illustrating the minimum required configuration of an image processing apparatus. The image processing apparatus includes: a reading device 110; a setting UI 108, an image processing section 401; CPU 402; a memory device 403; and RAM 404, and they are connected each other by a bus 107. The reading device 110 reads a manuscript and outputs the read image. The setting UI 108 is a user interface for a user to give various instructions such as start of reading to the image processing apparatus. The image processing section 401 receives data from other constituents via the bus 107 and performs various image processing. CPU 402 executes a program expanded in RAM 404 etc. to control image processing. The memory device 403 saves parameters required for image processing and image processing programs. The image processing section 401, CPU 402 and RAM 404 are mounted on a controller 106. However, it is not necessarily required for the configuration to have the same one as mentioned above, and anther necessary constituent, such as an external I/F for connecting an external device (such as PC and a workstation) and an external line to this apparatus, may be added.

In the present embodiment, for convenience, an image processing apparatus where a manuscript is read with its manuscript surface being brought into contact with the platen will be described. However, since the above mentioned problems are also present in other types of image processing apparatuses, the present proposal is also an effective approach for these image processing apparatuses. Moreover, although according to the present embodiment, a configuration is described, where the image processing for reducing reflection is performed by the controller 106 on the image processing apparatus, the processing can be achieved by software. Therefore, it is also possible to perform processing on PC that is the same one as the below described processing by sending an image read once by the reading device 110 to PC.

Figure 5:
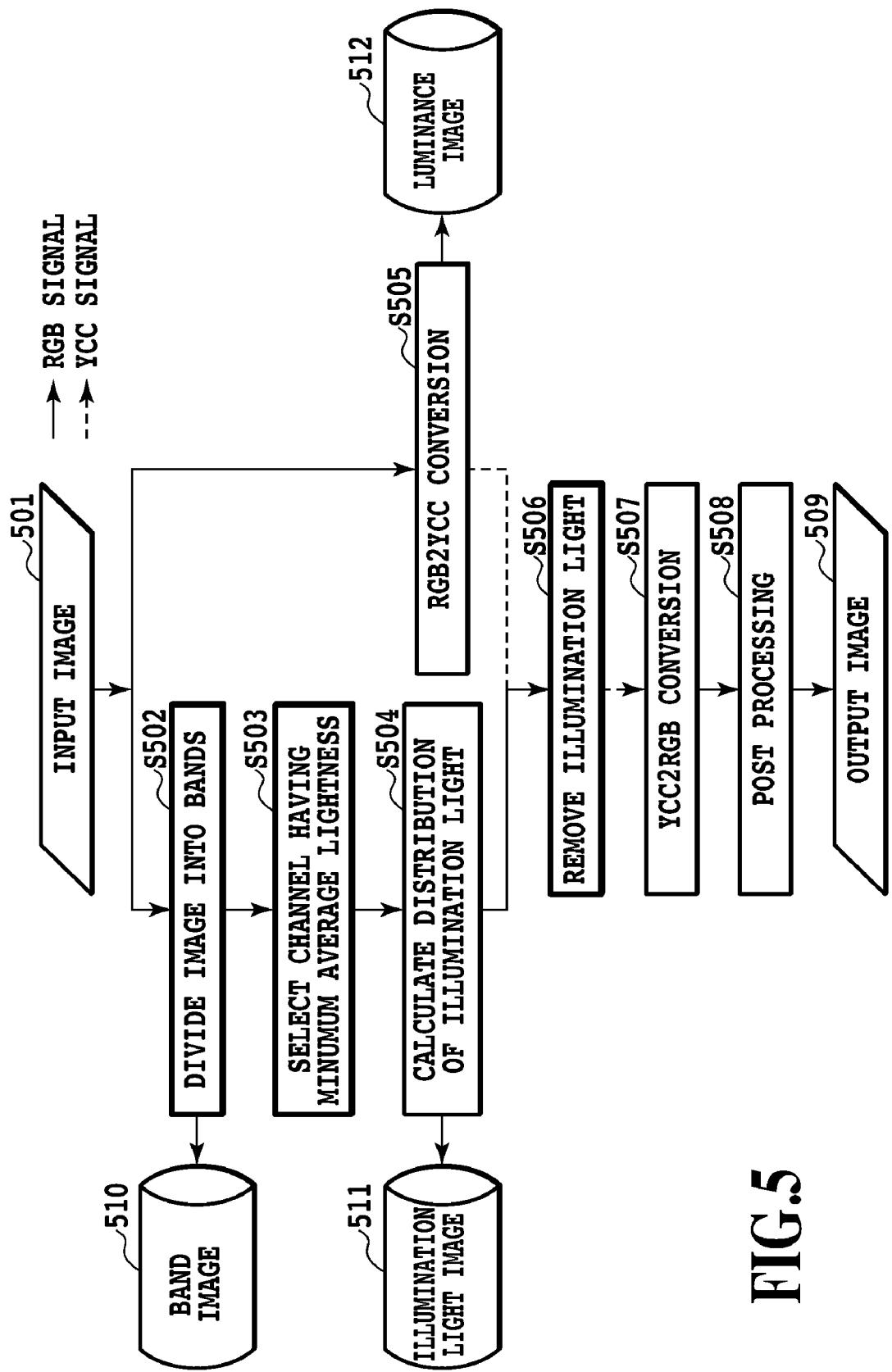
FIG. 5 is a flowchart illustrating one example of processing according to one embodiment.

FIG. 5 is a flowchart illustrating the flow of the processing of the present embodiment. The processing is performed by CPU 402 by steps of: reading a program stored on RAM 404 or the memory device 403; and executing the program to control each of the constituents of the image processing apparatus. The feature of the processing according to the present embodiment is in that an input image (the image read by the reading device 110) having reflection at least partially is divided into stripe-shaped band images (S502) firstly; after that, the illumination light distribution of reflection is calculated for each band image by a specific channel (S504); and the illumination light image is removed from a YCC converted luminance image 512 (S506). As a result of this, influence of reflection can be reduced effectively.

Hereinafter, each processing will be described step-by-step.

At Step 502, the input image 501 read by the reading device 110 is divided into band images. This processing is performed because it is desirable to remove extra pieces of information as many as possible in order to extract suitably the illumination light image of the reflection area in the below described processing.

In order to divide the input image 501 read by the reading device 110 into bands, firstly, the input image 501 is temporarily stored on the memory device 403, and read onto RAM 404. Data of dividing direction and dividing number that is stored on the memory device 403 in advance is also read onto RAM 404 from the device 403. After that, according to read data of dividing direction and dividing number, the input image 501 is divided sequentially from its one end into band images 510 on RAM 404. That is, the divided width of the band images 510 is determined depending on the divided number of the read image (the input image 501). The band images 510 are stored on the memory device 403 in order so that the position of each image in the entire input image 501 can be determined. Alternatively, they may be stored by being added with an index for each band. In order to generate a second or the subsequent band images 510, the start position of the next band is calculated by CPU 402 from the band width and the number of generated bands.

Figure 6:
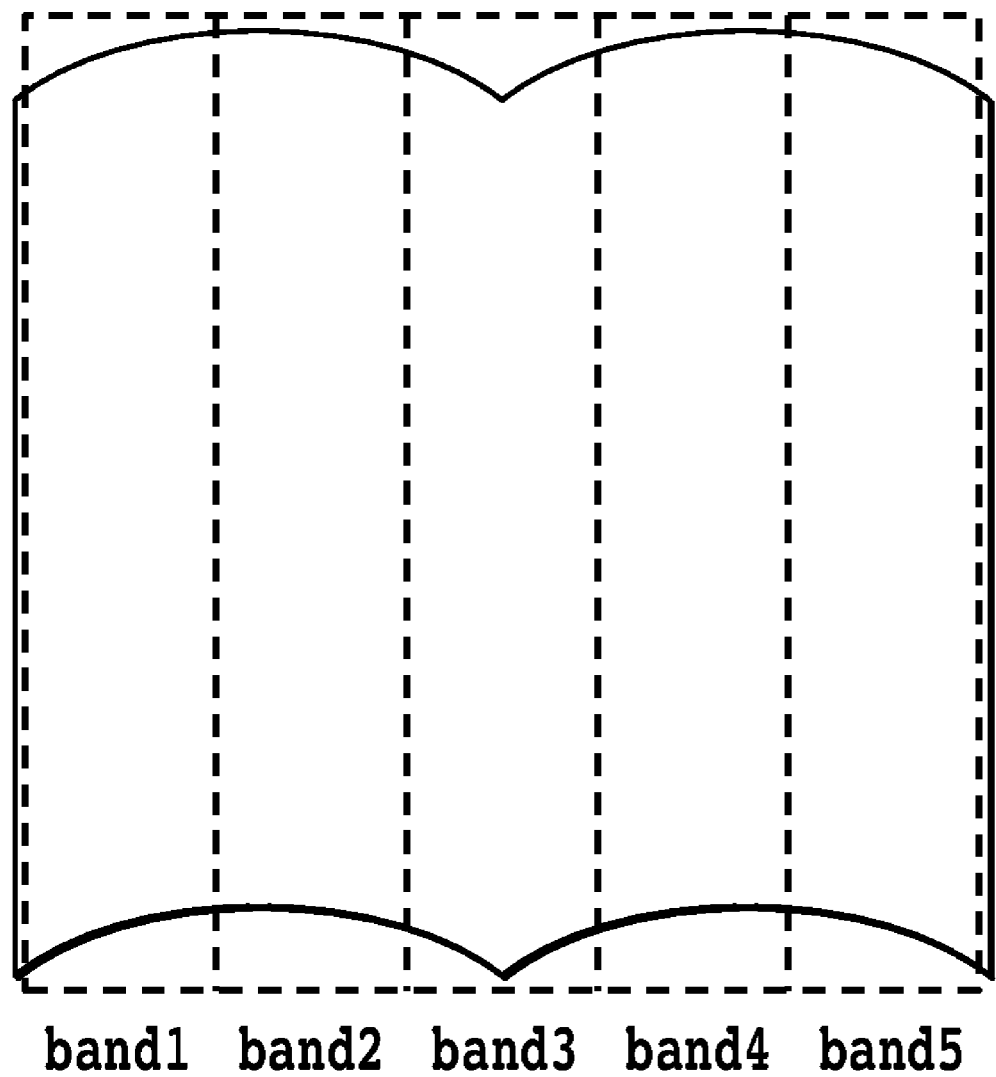
FIG. 6 is a schematic view of one example of division into bands.

FIG. 6 illustrates one example of a method for dividing an input image into band images. As illustrated in FIG. 6, the dividing direction of the band images supposed to be in parallel with the direction in which reflection occurs. For example, when an A4 size of book manuscript is read in double pages (A3 size), the read image is divided in the sub-scanning direction. It is desirable to optimally determine the dividing number depending on the reflection area, but, since position of reflection can not be specified, it is determined based on a projected size of reflection. If it is known that the width of the light source reflected on an image scanned with 600 dpi is an order of 40 pixels, it would be determined to divide the image into bands each having a width of at least 40 pixels or more. Alternatively, a method for dividing the image into bands, of which dividing number is set in advance, may also be considered. For a method for dividing the image into a fixed number of bands, there is an advantage in that even if the resolution is changed, the image can be divided into bands without re-calculation.

Here, Step 505 of generating a luminance image 512 that will be used in later processing will be described. The input image 501 saved on the memory device 403 is read onto RAM 404, and the read image is converted into a YCbCr luminance image 512 in the image processing section. The YCbCr luminance image 512 can be obtained by the following calculations:

$Y=0.29891R+0.587G+0.114B$ $Cb=-0.16871R-0.33126G+0.50000B$ $Cr=0.50000R-0.41869G-0.08131B$

The generated luminance image 512 is saved on the memory device 403 via the bus 107. The above-mentioned processing is carried out for all of the band images 510 to be a target of removing reflection, and generation of the luminance image 512 (Step 505) will be finished.

Hereinafter, a band image 510 having reflection will be described.

At Step 503, any one of the RGB color components is selected as the channel of a color component used for optimally extracting the illumination light image of the reflection area in the band image 510 that is a processing target. Here the illumination light image to be extracted is referred to as image data representing the change of an illumination component in the image. Firstly, the band image 510 saved on the memory device 403 are read onto RAM 404, the average values (average lightness) of RGB color components are calculated, respectively, and the calculated values are held on the memory device 403. The calculated average values (average lightness) of all of RGB color components are compared, and a color component having the lowest (minimum) lightness value is selected and it is output to the image processing section 401 via the bus 107 together with the band image 510.

The selected color component (channel) is used for extracting only the illumination light image as much as possible when the image is extracted from the reflection area by the below described processing. It is considered that all channels of RGB have relatively large lightness values in the reflection area that is whitish than the surroundings, on the contrary, in areas other than the reflection area, it is considered that lightness differs largely for each channel. Here, if an image has, for example, a reddish (R) color at areas other than the reflection area, since the lightness of the R channel has a high value at areas other than the reflection area, it will be difficult to extract only the illumination light image in the reflection area using the R channel. On the contrary, since the lightness of the blue (B) channel has a relatively large value only in the reflection area, if it has a small value in areas other than the reflection area, it is effective to extract the illumination light image using the B channel. Since, a channel where lightness of image data is changed largely by reflection is the channel of a color component having low lightness. That is, it is effective to extract the illumination light image using a channel having a lowest average lightness value. Moreover, although if this processing is performed to the entire input image, extra color information of the surroundings is also added, effective channel selection can be performed by dividing the input image into band images and performing this processing at a limited area.

Moreover, two channels may be selected in ascending order of their average lightness values.

Furthermore, two channels may be selected in ascending order of their average lightness values only when difference between the maximum value and the minimum value of the lightness of the RGB channels is equal to or smaller than a given value (for example; 50). This is because it is more effective to use two channels for extracting the illumination light image than using one channel.

Next, at Step 504, the illumination light image is extracted (i.e.; generated) from the channel selected at Step 503. The image processing section 401 performs filtering processing on the selected channel of the band images 510 expanded on RAM 403 and calculates the illumination light distribution to extract the illumination light image. The extracted illumination light image 511 is sent to the memory device 403 via the bus 107 and saved thereon.

The illumination light image can be grasped the low frequency components in an image as the change of illumination. Methods for extracting the illumination light image includes a method for performing convolution operation by a Gaussian filter on surrounding pixels including an attention pixel (x, y), and a method for performing convolution operation by a bilateral filter. In other words, the illumination light image is an image representing the amount of the change in luminance values due to reflection of the light source occurring when a manuscript is read. If there is no reflection of the light source, the illumination light image will be a black image having a luminance value of zero. Moreover, in order to accelerate the convolution operation, the filtering processing may be performed after down-sampling the pixels so that the relative filter size can be larger even for a small filter size. As mentioned above, since the width of reflection is determined to some extent depending on the size of the light source, a filter will be used in estimation of its optimal size.

Hereinafter, the method for performing convolution operation by a Gaussian filter on surrounding pixels including an attention pixel (x, y) will be described. For the attention pixel (x, y), values of the surrounding pixels Vs(x, y) are expressed by the following formula:

$$Vs(x, y)=Vc(x, y)*G(x, y)$$

Where, * represents convolution operation (Convolution), and G(x, y) is Gaussian function expressed by the following formula:

$$G=K \exp\{-(x^2+y^2)/\sigma^2\}$$

$$\iint G(x,y)dxdy=1$$

Where, K represents a level of Gaussian function, and σ represents the standard deviation of Gaussian function.

At Step 506, the reflected illumination light is removed (corrected). This step acts as a correction unit of reflection. The reflected illumination light is removed using the illumination light image 511 and the luminance image 512 saved on the memory device 403. The illumination light image 511 and the luminance image 512 of the same band are read from the memory device 403, and the image processing section 401 subtracts the lightness value of the illumination light image 511 from the luminance value of the luminance image 512 for each pixel. Here, the illumination light image 511 is an RGB image. That is, using the extent of lightness brightened by reflection represented for each position by the illumination light image 511 as a correction amount, the luminance value for each position of the luminance image 512 is corrected. An advantage of adjusting the luminance value is in that only the brightness of an image can be changed without losing the color balance of the image.

Figure 8A:
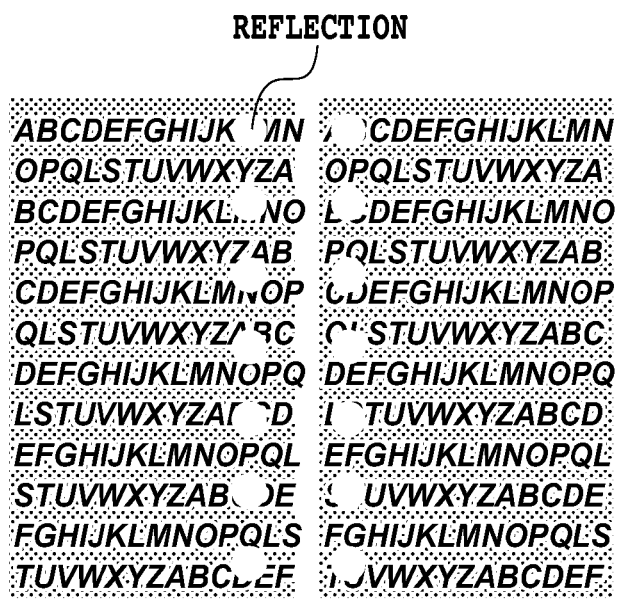
FIG. 8A is a schematic view illustrating one example of an input image or an output image in processing according to one embodiment.
Figure 8B:
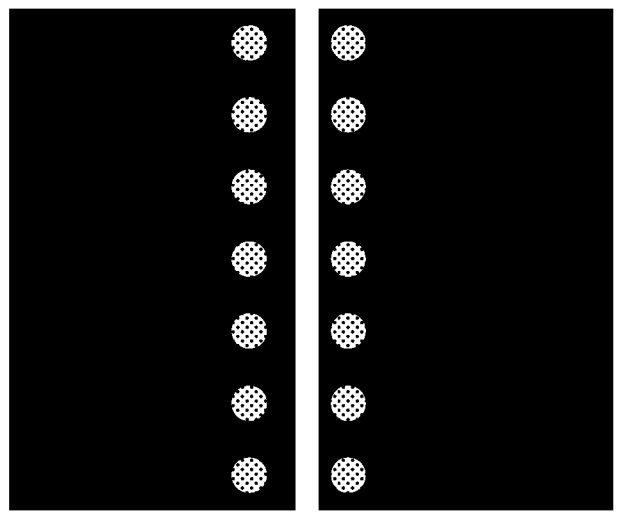
FIG. 8B is a schematic view illustrating one example of an input image or an output image in processing according to one embodiment.
Figure 8C:
FIG. 8C is a schematic view illustrating one example of an input image or an output image in processing according to one embodiment.

If FIG. 8A represents an input image 501 having reflection, the illumination light image as illustrated in FIG. 8B is extracted by the above-mentioned processing. The illumination light image extracted by the selected channel represents the area brightened by reflection and the level of the brightened lightness. Subtracting the lightness value of the illumination light image from the luminance value of the reflected image enables the lightness of an area where the lightness is read to be bright more than necessary by the influence of reflection to return a suitable level substantially without changing the lightness values of areas other than the reflected area. An image as illustrated in FIG. 8C, where the influence of reflection is reduced, can be obtained as the output image 509. In addition, as described at Step 505, the luminance value of the input image 501 is converted from RGB into YCbCr in advance. In addition, as a modified example, the luminance value may be obtained by converting RGB into L*a*b*.

At Step 507, an image where reflection is removed is generated by mating a Y channel where the illumination light is removed and CbCr channels of a luminance image 512 where no change is imparted and then converting the resultant YCbCr channels into RGB channels. Conversion from YCbCr into RGB is obtained by the following calculation:

$$R=Y+1.40200Cr$$

$$G=Y-0.34414Cb-0.71414Cr$$

$$B=Y+1.77200Cb$$

Although the above description is given with respect to a band where reflection is occurred, actually, it is not known that reflection is occurred in which band. Therefore, it is considered to subjects all bands to processing from Step 503 to Step 507. However, at least bands of both ends should be brought into contact with the platen. Thereby, bands other than the both ends bands are subjected to processing as bands where removal of illumination light is necessary. As a result, difference in color between a band subjected to processing and a band not subjected to processing occurs. That is, difference in color between bands subjected to reflection correction occurs. In other cases, as a result of subjecting bands to reflection correction at a correction amount differing for each band, difference in color between bands also occurs.

Figure 7:
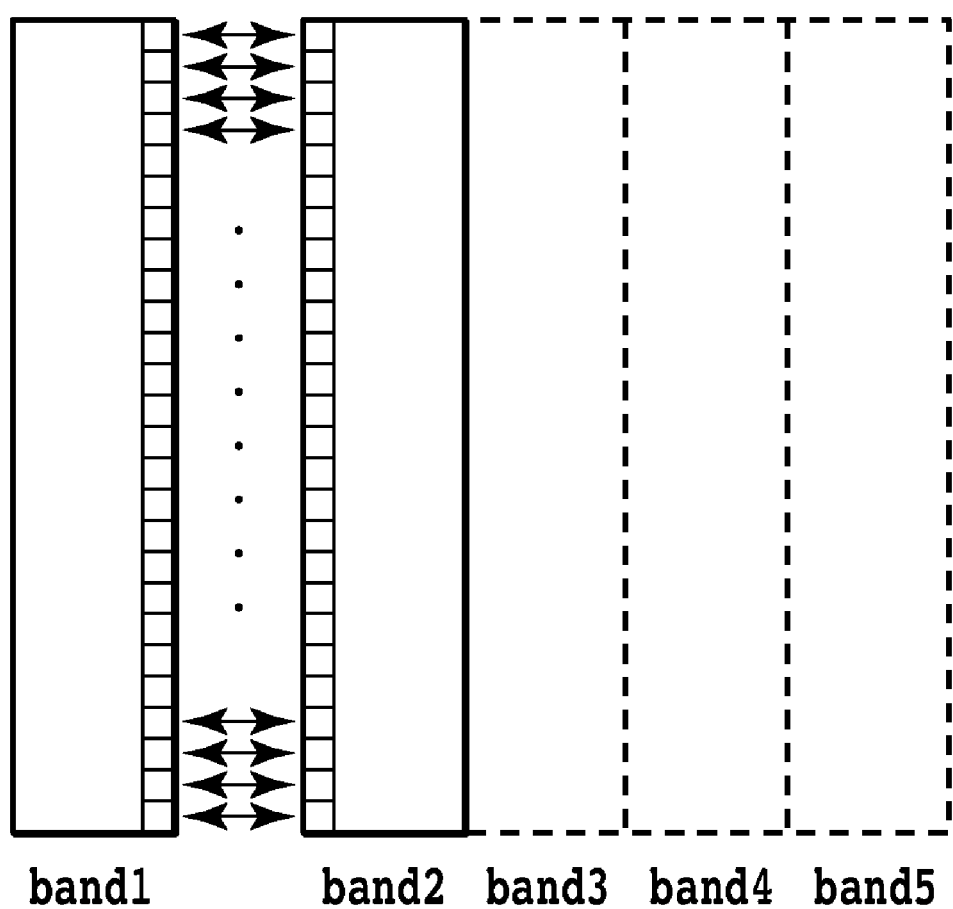
FIG. 7 is a schematic view illustrating one example of corresponding data when creating a color conversion table.
Figure 11:
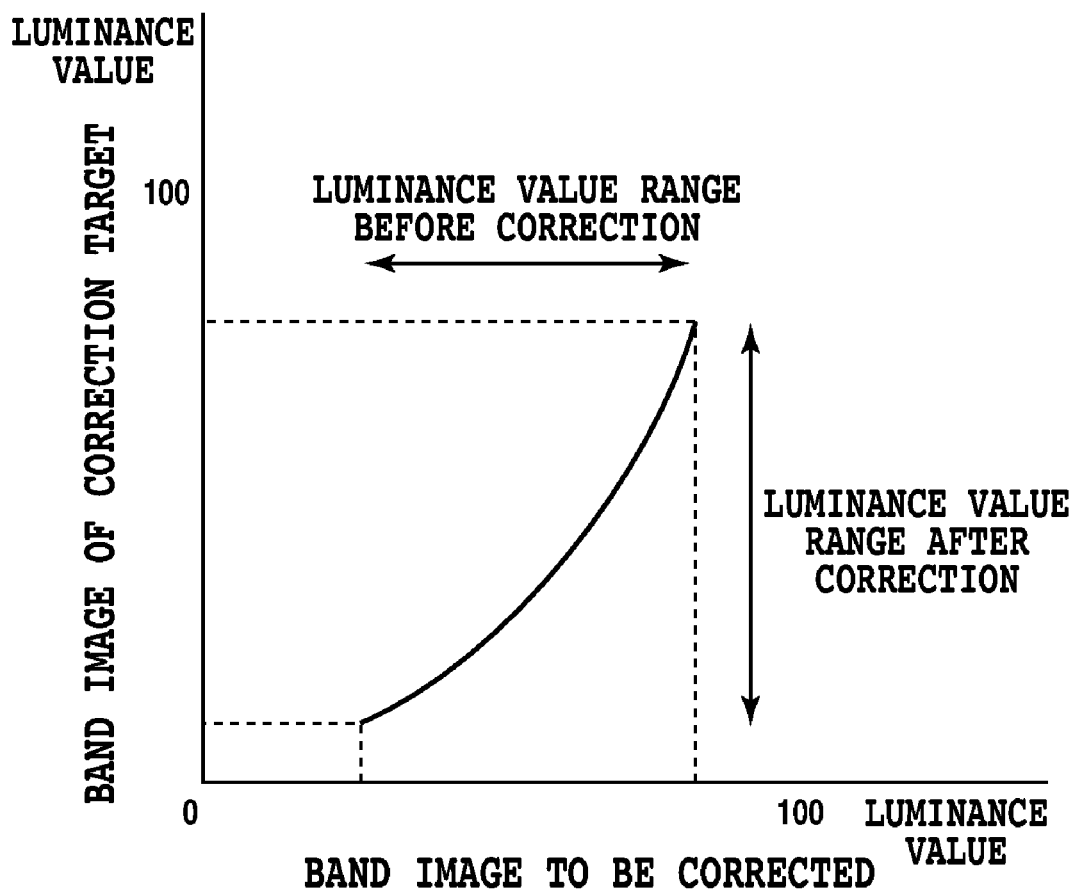
FIG. 11 illustrates one example of a one-dimensional conversion table made based on the luminance value according to one embodiment.

A correction method for reducing the difference in color between bands in the post processing at Step 508, will be described below. Firstly, in order to correct the difference in color between bands, by referring neighboring pixels of each band, a correction table is created. Since the luminance value or the RGB values of the neighboring pixels between bands as illustrated in FIG. 7 are considered to be substantially the same each other, a one-dimensional or a three-dimensional color conversion table is created from the luminance value or the RGB values of the neighboring pixels. By suitably performing interpolation (for example; linear interpolation) on areas having no data, a color conversion table is created and saved on the memory device 403. A band image 510 to be a target and a band image 510 to be corrected are read onto RAM 404 from the memory device 403. The band image 510 to be a target is, for example, band 1 in FIG. 7 that is a band image 510 located at a farthest point of the input image 501. The band image 510 to be corrected is, for example, band 2 in FIG. 7 that is a band image 510 neighboring the band image 510 to be a target and not subjected to reflection correction. Using FIG. 11, one example of a one-dimensional conversion table created based on the luminance value will be described.

All relationships in luminance values of the neighboring pixels between band 1 and band 2 in FIG. 7 are extracted and plotted on a graph. The luminance values in band 1 are reduced as a whole due to the reflection correction processing, on the contrary, band 2 is not subjected to correction, and thereby a conversion table is created, where the following relation is satisfied: the range of luminance values before correction<the range of luminance values after correction. In the image processing section, the band image 510 to be corrected is scanned from its one end, and a value corresponding to the read pixel value is retrieved from the created color conversion table. Then, the read pixel value is corrected to the value obtained from the retrieval. If there is no data coinciding with the pixel value in the table, the correction value is calculated by an interpolation operation from data of surroundings. Moreover, it is possible to create a three-dimensional conversion table from the RGB values of the band images and to use it as the color conversion table.

As the order for processing bands, the bands are processed in a manner where bands neighboring to the both ends are subjected to correction using the both end bands as targets, and then next neighboring bands are subjected to correction using the corrected bands as targets, and so on. Since the bands of the both ends are still the input images, not only step difference in color between bands is reduced, but also the color of the processed bands approaches to that of the input image 501. By the above-mentioned processing, an output image 509 where reflection is removed can be obtained.

As mentioned-above, according to the present embodiment, reflection of the light source, occurring when a book manuscript is read, can be corrected by executing a program, that is, by image processing by means of software. As a result, in comparison with a case of correction by changing a device, reflection correction can be achieved at a lower cost. Furthermore, since correction is performed for each image area at a different correction amount based on the illumination light distribution extracted from the band images obtained by dividing the input image, effective reflection correction can be achieved regardless of the type of the light source. This enables generalized reflection correction to be achieved.

[Second Embodiment]

Here, an approach that is different from that of the first embodiment in the dividing width of bands, will be described. Moreover, description for the same parts as those of the first embodiment will be eliminated.

The optimal dividing width of bands can be estimated from the size of the reflected light source. However, if magnification is specified during reading, the read image will be enlarged or shrunk. In this case, since the size of the reflected area will also change, the dividing width of bands has to be adjusted according to the magnification ratio of the read image.

In order to estimate the optimal dividing width of bands from a magnification ratio, firstly, the magnification ratio set in the setting UI 109 is acquired. If the acquired magnification ration is not one, the read image is enlarged or shrunk. The dividing width of bands saved on the memory device 403 in advance is read and multiplied with the acquired magnification ratio, and the resultant value is used as the dividing width of bands at the magnification. The new dividing width of bands may be saved on RAM 404 so as to be directly used for the subsequent processing, or may be saved on the memory device 403 as a new dividing width of bands at magnification. If specified magnification ratios are selected in several kinds, correspondence relationship between the magnification ratio and the dividing width of bands maybe saved on the memory device 403 as a table.

By the above-mentioned method, reflection can be removed even when a manuscript is read at setting of magnification.

[Third Embodiment]

Here, an approach that is different from that of the first embodiment in selection of channel for optimally extracting the illumination light image of the reflection area (S503) will be described. Moreover, description for the same parts as those of the first embodiment will be omitted.

In a band to be processed, when a channel for extracting an illumination light image is selected, by calculating average values of each channel in the band, and a channel having a lowest value is selected as the optimal channel for extracting the illumination light image. However, every channel has a large value in case of a high luminance image, that is, it is difficult to extract only the illumination light image. At the same time, it can also be said that difference in luminance between the reflected high luminance area and the high luminance area in the manuscript is small in case of a high luminance image. That is, the influence of reflection tends to be not notable for a high luminance image than for a low luminance image. Therefore, in some cases, the influence of image change derived by removal of reflection may give odd feeling to a user than the influence of reflection.

Figure 9:
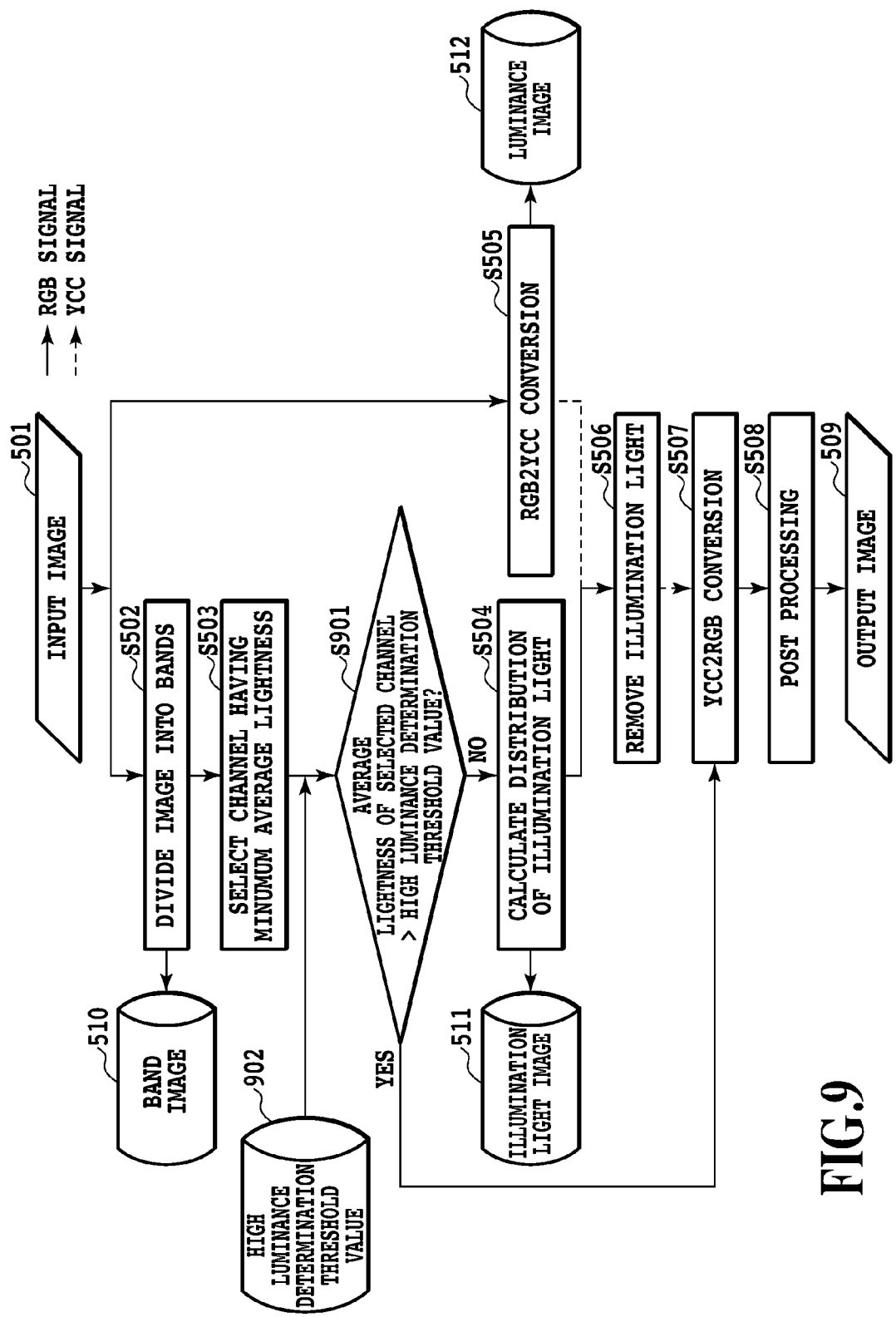
FIG. 9 is a flowchart illustrating another example of processing according to one embodiment.

Thus, using the average lightness of RGB channels of each band calculated at channel selection (S503), whether an image is a high luminance image or not is determined. FIG. 9 illustrates a flow of processing according to the present embodiment. A given threshold value for determination (for example; luminance value of 200) is saved on the memory device 403 in advance as the threshold value for determining high luminance. After a channel having low average lightness is selected at channel selection (S503), at Step 901, the average lightness value of the selected channel and the threshold value for determining high luminance is compared. If the average lightness value is higher than the threshold value, the band can be determined as a high luminance image, thereby, the subsequent processing (S504 and S506) will be eliminated, and if the average lightness value is lower than the threshold value, processing of S504 and subsequent processing will be performed as usual.

By the above processing, unnecessary degradation of the image quality can be avoided by eliminating correction processing for a band determined to be a high luminance image.

[Fourth Embodiment]

Here, an approach that is different from that of the first embodiment in processing of removing the reflected illumination light (S506) will be described. Moreover, description for the same parts as those of the first embodiment will be omitted.

In removal of illumination light, only the brightness can be changed without losing the color balance of an image by correcting an area that is made too bright by changing the luminance value. However, changing the luminance value largely leads to the change of saturation, and thereby there is a risk in a method for using the calculated illumination value as the correction value directly. Since, it is difficult for the change in the luminance value of a certain value or more to be considered as the influence of reflection, a method for rounding the illumination light component greater than a given threshold value of correction amount to the threshold value of correction amount is effective. The threshold value of correction amount is referred to as a threshold value of the variation of a luminance value being in such a level that the change of color is not notable if the luminance value is changed, for example, a value such as 20 in 255 gradations can be considered. Alternatively, a method for changing the threshold value of correction amount by changing the kind and glossiness etc. of a paper is also possible.

Figure 10:
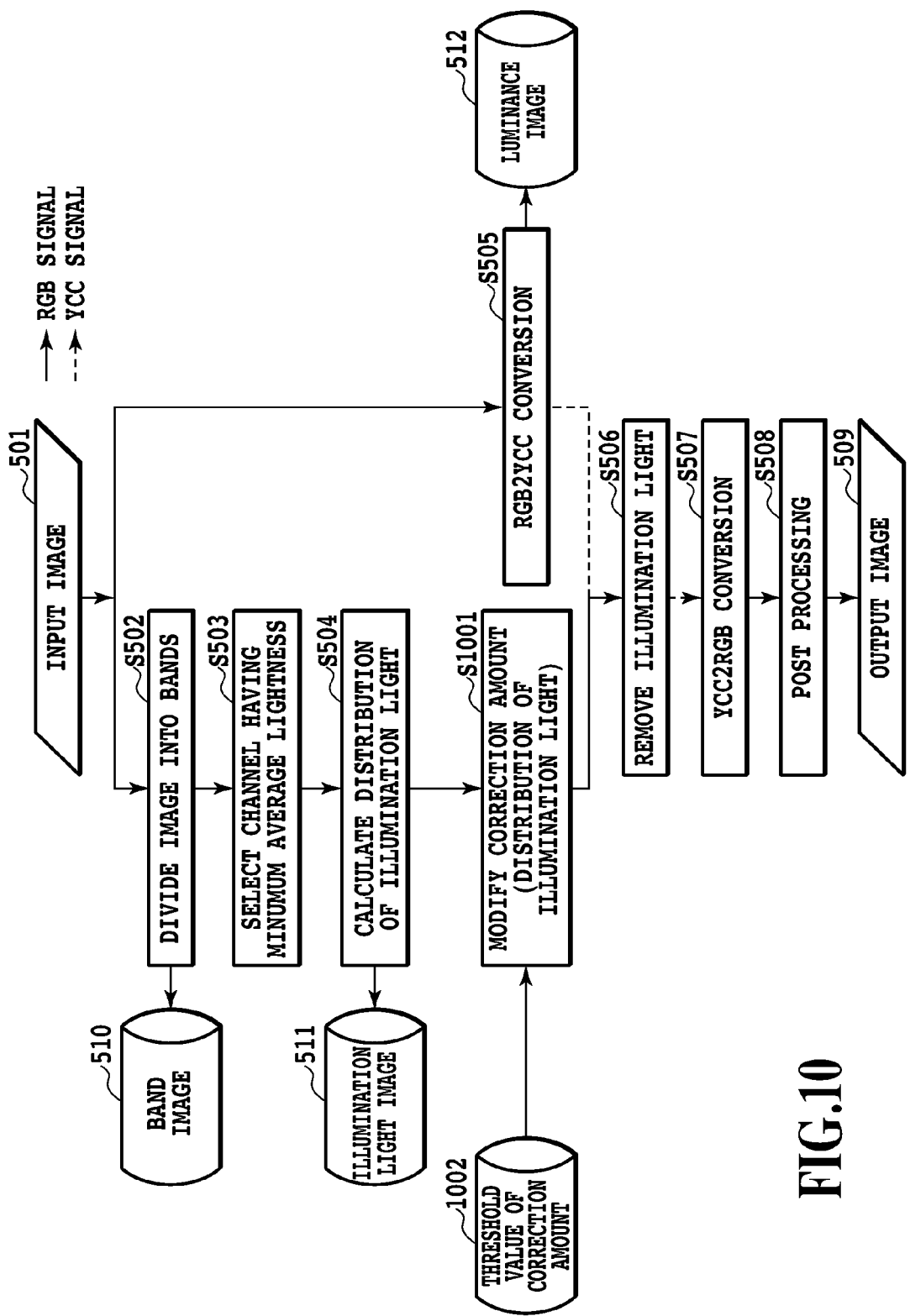
FIG. 10 is a flowchart illustrating further another example of processing according to one embodiment.

FIG. 10 illustrates a flow of processing according to the present embodiment. The threshold value of correction amount 1002 is saved on the memory device 403 in advance. A method including: Step 504 of extracting the illumination light image 511 from a selected channel, and subsequent Step 1001 of processing the threshold value of the illumination light image 511 using the threshold value of correction amount 1002 read from the memory device 403, can be considered. By this method, at Step 506 of removal processing of illumination light using the illumination light image 511, correction greater than the threshold value of correction amount 1002 will not be performed. Alternatively, a method for performing operation of rounding the pixel values of the illumination light image 511 greater than the threshold value of correction amount 1002 during subtracting the illumination light image 511 from the luminance image 512 at Step 506, can also be considered.

By the above-mentioned processing, it is possible to avoid a risk of performing un-necessary correction by providing an upper limit value of the correction value of the illumination light without using it directly when it is calculated. Since the influence of reflection can be removed to an extent even if the upper limit value is provided, it is considered that the effect of this approach can be obtained.

[Other Embodiments]

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-280060, filed Oct. 30, 2008, which is hereby incorporated by reference herein in its entirety.

What is claimed is:

1. An image processing apparatus comprising:
a selection unit selecting an RGB color component having minimum average values of each RGB color component among RGB color components of a read image having reflection of a light source that occurs when a document is read;
a calculation unit calculating the amount of change of luminance values of pixels of the read image derived from the reflection, from the values of pixels of the color components selected in the read image; and
a correction unit correcting the reflection of the light source in the read image by correcting the luminance values of pixels of the read image using the calculated amount of change of the luminance values of the pixels.

2. The image processing apparatus according to claim 1, further comprising
a division unit dividing the read image into a plurality of stripe-shaped band images, wherein
the selection unit selects a color component having average values of RGB components in the band images that are smaller than those of other color components.

3. The image processing apparatus according to claim 2, wherein
the division unit determines a dividing width of the band images according to the resolution of the read image.

4. The image processing apparatus according to claim 2, wherein
the division unit determines a dividing width of the band images according to the magnification ratio of the read image.

5. The image processing apparatus according to claim 2, wherein
the division unit determines a dividing width of the band images according to the number of division of the read image.

6. The image processing apparatus according to claim 2, further comprising
a determination unit determining whether the average lightness values of the band images exceed a given lightness value, wherein
the correction unit performs the correction on band images each having the average lightness value determined as not exceeding the given lightness value, and does not perform the correction on band images each having an average lightness value determined as exceeding the given lightness value.

7. The image processing apparatus according to claim 2, wherein
in order to reduce the difference in color between the corrected band images, luminance of one end of the band images and luminance of one end of a band image neighboring to the band images are corrected using a correction table.

8. The image processing apparatus according to claim 1, wherein
the correction unit corrects the light of the light source reflected on the read image by subtracting the amount of change of luminance value calculated by the calculation unit from the luminance value of the read image.

9. An image processing method comprising the steps of:
selecting an RGB color component having minimum average values of each RGB color component of a read image among RGB color components of an read image having reflection of a light source that occurs when a document is read;
calculating the amount of change of luminance values of pixels of the read image derived from the reflection, from the values of pixels of the color components selected in the read image; and
correcting the reflection of the light source in the read image by correcting the luminance values of pixels of the read image using the calculated amount of the change of the luminance values of the pixels;
wherein the foregoing steps are performed by one or more processing units executing a program stored in a memory.

10. A non-transitory computer readable storage medium having a program retrievably stored thereon for causing a computer to execute the steps of:
selecting an RGB color component having minimum average values of each RGB color component of a read image among RGB color components of an read image having reflection of a light source that occurs when a document is read;

calculating the amount of change of luminance values of pixels of the read image derived from the reflection, from the values of pixels of the color components selected in the read image; and correcting the reflection of the light source in the read image by correcting the luminance values of pixels of the read image using the calculated amount of the change of the luminance values of the pixels.

* * * * *